Aug. 8, 1961    M. WAHLSTROM    2,995,069
MULTI-SPEED TOOL SPINDLES FED BY COMMON QUILL
Filed Dec. 19, 1958    4 Sheets-Sheet 1

INVENTOR
Magnus Wahlstrom
BY
ATTORNEY

Aug. 8, 1961  M. WAHLSTROM  2,995,069
MULTI-SPEED TOOL SPINDLES FED BY COMMON QUILL
Filed Dec. 19, 1958  4 Sheets-Sheet 4

INVENTOR
Magnus Wahlstrom
BY
ATTORNEY

United States Patent Office 2,995,069
Patented Aug. 8, 1961

2,995,069
MULTI-SPEED TOOL SPINDLES FED BY COMMON QUILL
Magnus Wahlstrom, Easton, Conn., assignor to The Bridgeport Machines, Inc., Bridgeport, Conn., a corporation of Connecticut
Filed Dec. 19, 1958, Ser. No. 781,787
16 Claims. (Cl. 90—11)

This invention relates to improvements in a machine tool such as a self-powered milling head or attachment like that described in United States Patent No. 2,275,291, the improvements enabling different work cutting tools to be rotated optionally at critically contrasting ranges of speed and fed into the work by use of one and the same quill. Conventional rotary speeds of from 80 r.p.m. to 2,750 r.p.m. lie within a conventional rotary cutting speed range in the type of machine tool herein concerned, whereas speeds ranging from 7,000 r.p.m. to 40,000 r.p.m. are regarded as ultra high cutting speeds in such type of machine tool.

The quill-fed, tool driving rotary spindle of a conventional drilling or milling machine is commonly made hollow to afford a passageway lengthwise therethrough for a long draw rod. The draw rod extends throughout the length of the spindle and usually has screw-threaded engagement with the inner end of the shank of a conventional tool holding collet for forcibly drawing the latter into a conically tapered open mouth at the outer end of the spindle. This causes the spring jaws of the collet to be squeezed into releasable holding engagement with the shank of the work cutting tool.

An object of this invention is to utilize the hollow of such conventional drive spindle to accommodate an ultra high speed power transmission inclusive of an ultra high speed rotary bearing unit and an ultra high speed drive shaft extending throughout the length of the hollow of the spindle for transmitting rotary drive to a chuck that holds the ultra high speed cutter and is journaled in the special high speed bearing unit.

A further object is to provide an ultra high speed prime mover arranged to power the high speed transmission when the latter is so combined with the conventional hollow spindle of a milling head, drill press or the like.

Another object is so to incorporate the high speed power transmission with the conventional quill and spindle of the machine that the transmission parts as well as the ultra high speed motor are easily removable from the spindle at will and without disturbing any of the other parts of the basic machine tool or its capacities for operating.

A further object is to make the ultra high speed, tool driving shaft hollow with its length separable in sections which in operation are held fixedly together in coaxial alignment.

Another object is to mount the ultra high speed prime mover solely and fixedly on the aforesaid hollow rotary spindle of the machine tool whereby the prime mover travels bodily in unison with the spindle as the spindle is advanced toward or retracted from the work.

An alternative object is to station the ultra high speed prime mover fixedly but removably on the framework of the basic machine and to arrange the aforesaid ultra high speed tool driving shaft to slide telescopically in relation to the thus stationed body of the prime mover while being rotated thereby.

These and other objects of the invention will appear in fuller particular from the following description of successful embodiments of the improvements having reference to the appended drawings wherein:

FIGS. 1 and 2 separately show fragmentary sectional views of actually continuous mechanism including both conventional and ultra high speed power sources combined in operative association with the same quill fed conventional hollow spindle of a milling or similar machine tool, the sections being taken on the plane 1—1 in FIG. 5 looking in the direction of the arrows.

Figure 5:
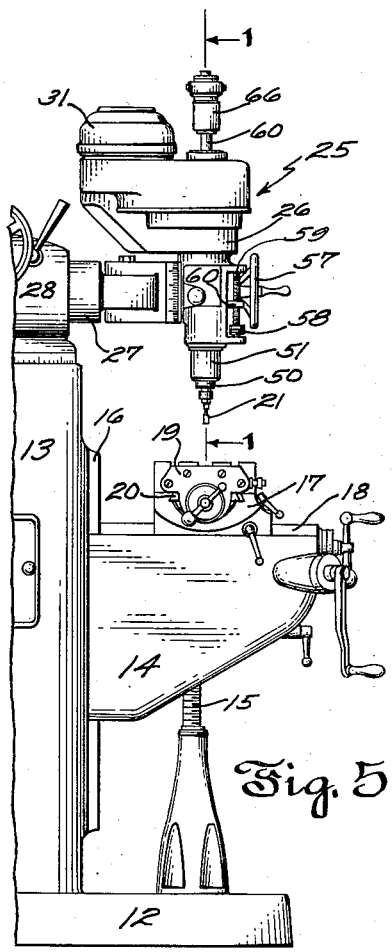
FIG. 5 shows on a much reduced scale more of a typical basic machine tool to which the present improvements are applicable.

What is referred to herein as the basic machine tool is illustrated in FIG. 5 as a milling machine including a base 12, standard 13, and knee 14 supported by a jack screw 15 at variable heights to which the knee may slide on the vertical ways 16 of the standard. The knee 14 carries a saddle 17 which is slidably mounted on horizontal ways 18 of the knee and which in turn carries a work table 19 that is slidably mounted on the ways 20 of the saddle. The usual suitable handles are shown for screw feeding the knee, saddle and work table in their respectively different three directions of adjustment to their positions of adjustment for feeding and holding the work in relation to the cutting path of an ultra high speed rotary tool 21 that is especially suited for producing an extra fine, precise or polished surface on a work piece free from chatter marks and irregularities that are characteristic of some cutting operations at relatively slow speeds.

In the illustrated type of basic machine, the ultra high speed cutting tool 21 is presented at the work machining end of a self-powered machining head or milling attachment designated 25 as a whole in FIG. 5 and in all of the same working locations that heretofore have been possible to an ordinary slow speed cutting tool when driven by the conventional machine. The framework 26 of the self-powered milling head 25 is firmly supported in variously stationed positions by an overarm 27 carried by the turret head 28 of the machine standard 13. Further details of the illustrated type of basic machine are disclosed in the aforesaid United States Patent No. 2,275,291.

Figure 1:
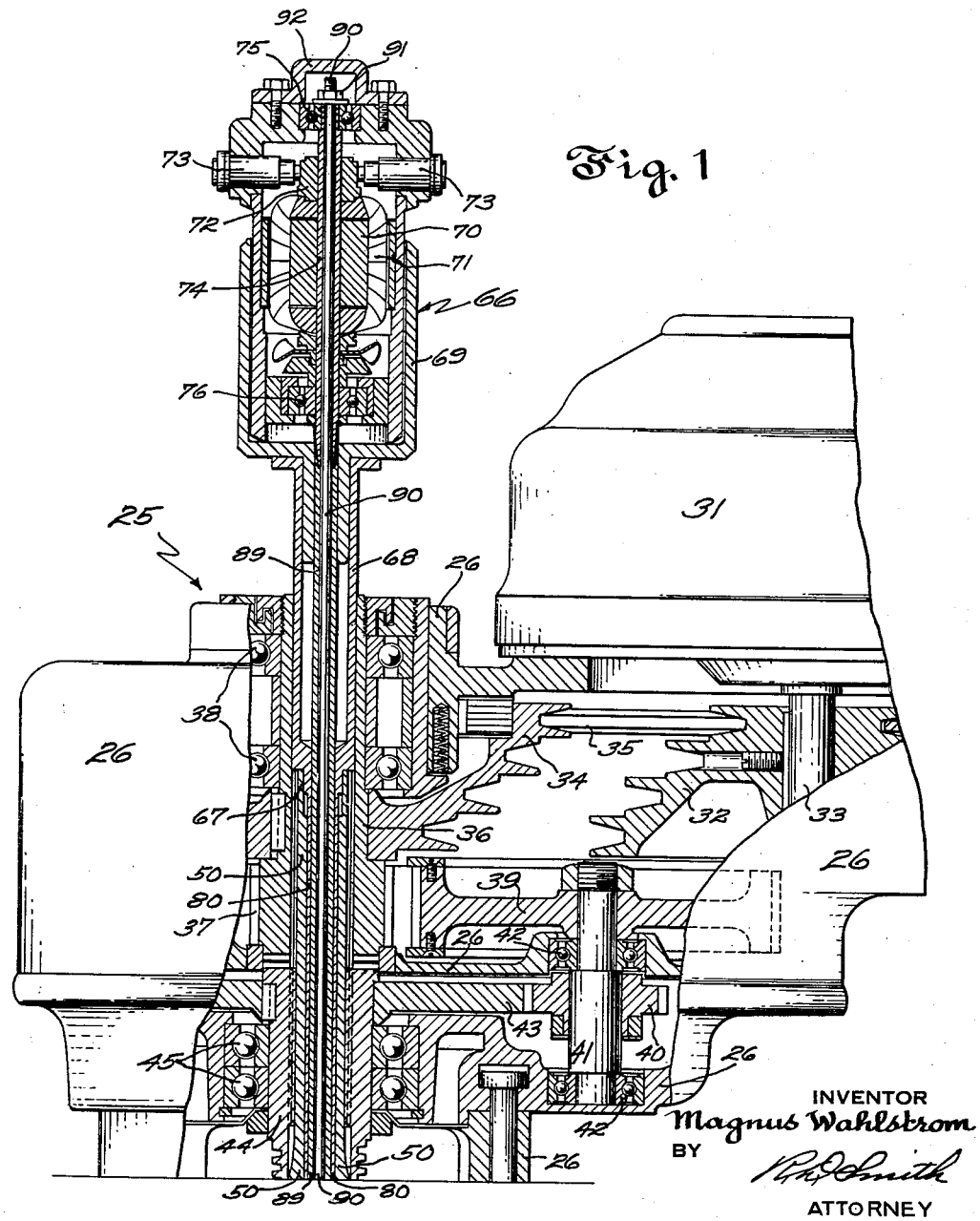
Figure 2:
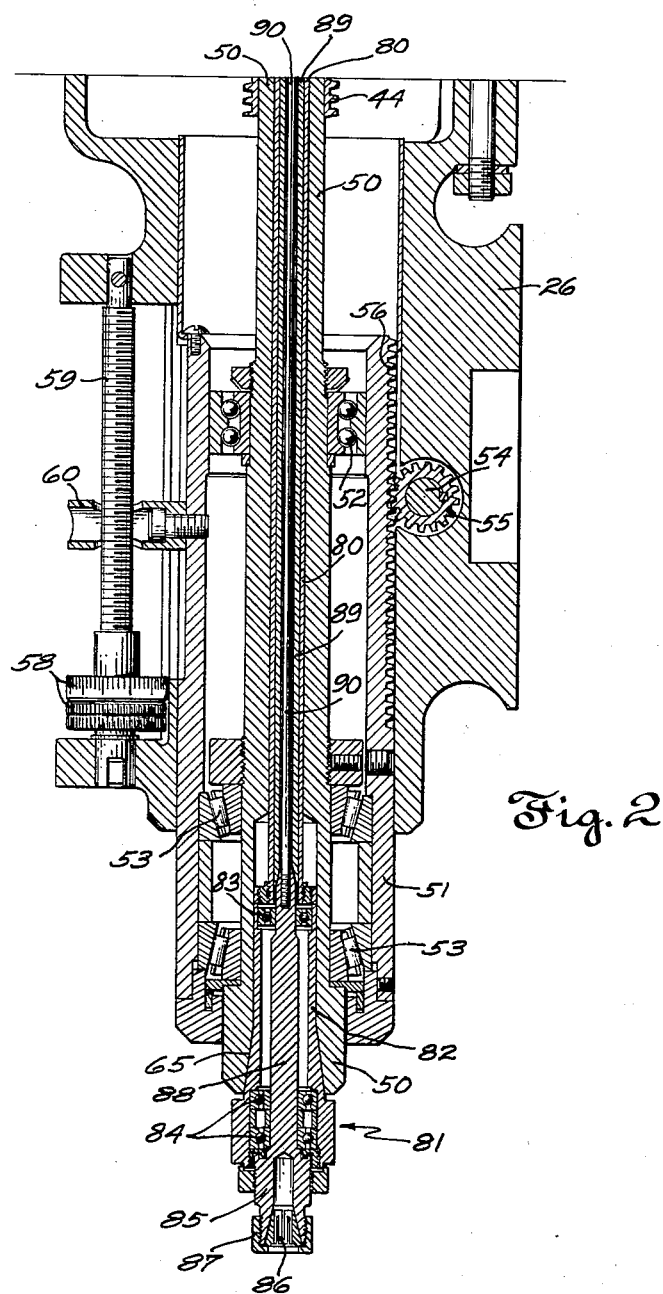

Referring more particularly to FIGS. 1 and 2, the machining head 25 is powered to drive a conventional milling tool (not shown) at speeds in a range of from 80 r.p.m. to 2,750 r.p.m. by an electric motor 31 stationed on the framework 26. Such range of speeds is conventional in the type of machine tool described. The driving of the cutter 21 by motor 31 is accomplished at variable speeds through a stepped driving pulley 32 fixed on the motor shaft 33 and a driven pulley 34 connected thereto by a shiftable belt 35 as usual.

The driven stepped pulley 34 is fixed on a hollow elongated hub 36 which has pinion teeth 37 cut thereon. Hub 36 is journaled with end thrust in a set of ball bearings 38 lodged in the framework 26. Pinion 37 is in driving mesh with a speed reduction idler gear 39 which, with idler pinion 40, is fixed on a stub shaft 41 journaled by means of ball bearings 42 in framework 26. Pinion 40 is in driving mesh with a load gear 43 having a hollow elongated hub 44 that is journaled with end thrust, and coaxially of driving pinion 37, in a set of ball bearings 45 also lodged in framework 26.

Extending centrally through the coaxial hollows of both gear hub 44 and pulley hub 36, and slidably splined to the latter, is the conventional hollow tool holding spindle 50. The length of this spindle below hub 44 is journaled with two-way end thrust in a conventional quill 51 by means of an upper set of ball bearings 52 and a lower set of tapered roller bearings 53. A hollow quill 51 has a lengthwise sliding bearing in a depending projection of the framework 26 in which a quill feeding shaft 54 is journaled. Shaft 54 carries fixed thereon a feed pinion 55 that is constantly in mesh with rack teeth 56, formed in the outer surface of the quill. Shaft 54 is turned by its usual wheel handle 57 shown in FIG. 5. As in conventional drill press and milling head practice the extent of up and down tool feeding movement of quill 51 may be limited at predetermined positions by setting the adjustable stop nuts 58 on a frame stationed screw post 59, such nuts being encountered by a stop lug 60 that travels with the quill.

Ordinarily a collet or other conventional form of tool chuck (not shown) removably holding a conventional work cutting tool (not shown) is lodged in the conically tapered hollow or socket 65 at the mouth or exposed end of hollow spindle 50. By the present improvements, however, the hollow of spindle 50 is made use of to accommodate the operating parts of an ultra high speed transmission by means of which power is transmitted to the special high speed cutter 21 while the latter is fed into work on machine table 19 by means of the same quill 51 and its operating parts 54, 55 and 57. The special high speed work machining tool 21 is powered by an independent ultra-high speed prime mover illustrated as the motor 66 whose rotary drive shaft 74 is in coaxial alignment with spindle 50 and that is supported on the machine tool and in FIGS. 1 and 2 is shown to be supported solely by and on the top end of the hollow spindle 50 of the machine tool, during which time said spindle can remain idle as to rotary motion because its usual power motor 31 is not running and the chuck 85 which holds tool 21 is rotatable independently of spindle 50.

The ultra high speed motor 66 and its power transmitting parts by which tool 21 is driven are constructed to be incorporated with the spindle 50 and removed therefrom without in any way disturbing other parts of the basic machine tool or their capacities for operating when and as desired.

In FIGS. 1 and 2 the counterbored top end 67 of hollow spindle 50 carries fixedly lodged therein a hollow post 68 that is thus made rigid with spindle 50. At its top end post 68 carries fixed thereon the casing of an ultra high speed motor 66 having an armature 70 that turns relatively to a magnetic stator 71 fixed within casing 69. The commutator and brushes of motor 66 are shown at 72 and 73, respectively. Post 68 is fixed to or integral with a thin walled draw tube 80 that extends nearly the full length of spindle 50 in sliding fit therewith and extends throughout the hollow thereof for pulling a high speed bearing unit 81 firmly to its seat in the open mouth or end socket of spindle 50 where ordinarily a tool holding collet (not shown) is lodged.

Bearing unit 81 has a conically tapering hollow mounting shank 82 that fits the conically shaped socket 65 of the spindle. Shank 82 has a hollow portion extending upward in the hollow of spindle 50 that terminates in screw threaded engagement with the bottom end of draw tube 80. Bearing unit 81 further comprises a ball bearing 83 in the said hollow shank thereof and a set of ball bearings 84 in a portion of the unit 81 that projects outside the mouth of spindle 50.

Journaled in the ball-bearings 83 and 84 there is a high speed chuck 85 receptive to the high speed cutting tool 21 at its lower end outside the bearing unit 81. Cutting tool 21 is clamped and released by means of a radially contractible and expandable bushing 86 whose conical periphery is forced into a conically tapered countersink in the open end of chuck 85 by means of a draw collar 87 which threads onto the periphery of the chuck terminus.

Chuck 85 has an upward extending solid shank 88 whose top end portion has a conically tapered periphery and contains a screw threaded hole. The externally tapered end of chuck shank 88 meets and conforms in conical shape and outside diameter to the bottom internally tapered end of a hollow rotary drive shaft 89 which extends upward through the hollow of draw tube 80 and is free to rotate internally thereof. Hollow shaft 89 continues upward through the hollow post 68 and its top end is internally tapered like its bottom end and likewise meets and conforms in conical shape and outside diameter to, the bottom end of the aforesaid hollow motor shaft 74. Thus the power transmission for chuck 85 is comprised of three coaxial hollow sections that meet end-to-end and interfit conically at their ends, one such section being the shank 88 of chuck 85, another being the hollow drive shaft 89, and another being the hollow motor shaft 74.

Through the continuous hollow of the latter two shaft sections there extends a tie rod 90 to serve as draw means and whose bottom end is in screw threaded engagement with the aforesaid tapped hole in the top end of chuck shank 88 and whose top end is threaded above the ball bearing 75 and receives a nut 91 which bears against the inner race of ball bearing 75. Nut 91 is accessible by removing the closure cap 92.

From the foregoing description of parts it will be evident from FIGS. 1 and 2 that when nut 91 is tightened against the inner race of hollow bearing 83 the nut can not further descend on the threaded tie rod 90 and in consequence the tie rod is pulled upward and in turn pulls upward on the chuck shank 88. This pulling or drawing force, acting through the axial thrust of the ball bearings, forces the tapered shank 82 of bearing unit 81 into firmly lodged position in the tapered socket mouth of spindle 50. Here the bearing unit 81 will remain lodged fixedly while the chuck 85 is free to be driven rotatively by power from the ultra high speed motor 66 transmitted through the hollow drive shaft 89.

Figure 3:
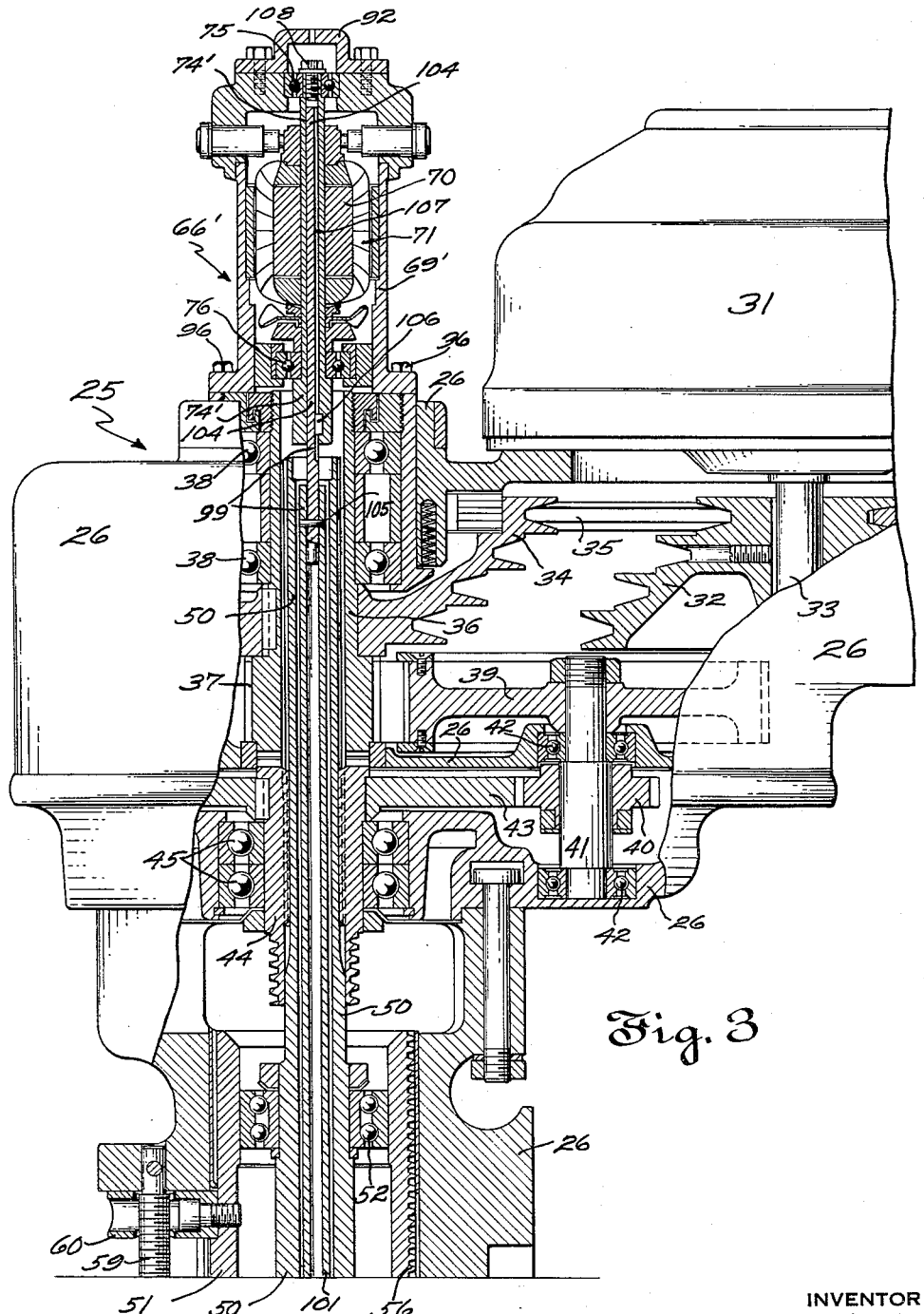
FIGS. 3 and 4 are views similar to FIGS. 1 and 2, respectively, showing a modification of the ultra high speed prime mover and a different manner of mounting it on the basic machine tool.
Figure 4:
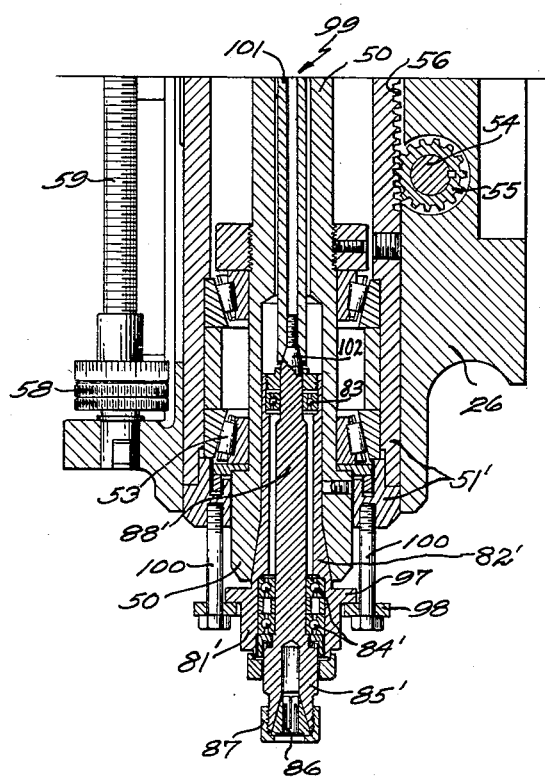

In the modified embodiment of the invention shown in FIGS. 3 and 4 the ultra high speed motor 66' has a casing 69' that is bodily stationed removably on the framework 26 of the basic machine by bolts 96, instead of being mounted on the hollow spindle 50. In this modification the rotary bearing unit 81' has a lateral flange 97 engaged by a draw collar 98 which is pulled upward by bolts 100 in FIG. 4 in a manner to force the tapered shank 82' of the bearing unit into wedged lodgement in the tapered socket at the mouth of the hollow spindle 50. Hence in the construction shown in FIGS. 3 and 4 there is no need for a draw tube and tie rod, such as 80 and 90, to force and hold the bearing unit 81' in the mouth of the hollow spindle 50. However, in FIG. 3 the high speed rotary drive shaft 99 needs to be slidable upward and downward in unison with tool feeding movement of spindle 50 while the body and casing 69' of the high speed motor remain stationary and removably secured to the machine framework 26 by bolts 96. This requires that there be slidable engagement between the hollow motor shaft 74' and the rotary drive shaft 99. For this purpose the greatest extent of the length of the latter is composed of a hollow member 101 whose bottom end is internally tapered to match the externally tapered top end of the upstanding shank 88' of chuck 85' at 102. The tapered ends of member 101 and shank 88' are drawn fixedly yet separably together by engagement of an externally screw threaded extremity of the chuck shank 88' with the screw threaded hollow in the bottom end of shaft member 101. The intermeshed screw threads at this point may be of somewhat loose fit to insure a tight fitting together at the tapered joint 102 which will insure member 101 and chuck 85 being brought and held together in precise coaxial alignment.

An upward extension 104 of the length of shaft member 101 is a solid member of reduced diameter secured fixedly to shaft member 101 by cross pin 105 and slidable lengthwise in and relatively to the hollow motor shaft 74' which in FIG. 3 carries a spline 106 that slidably engages an elongate keyway 107 in shaft extension 104. The head of a bolt 108 screwed into the top end of motor shaft 74' and overhanging the inner race of ball bearing 75 in FIG. 3 provides end thrust helping to support the weight of shaft 74'. Bolt 108 can be reached by removing the cover 92. By merely removing the casing bolts 96 the entire high speed motor 66 can be lifted off from the machine leaving the top end portion of shaft extension 104 exposed.

Figure 6:
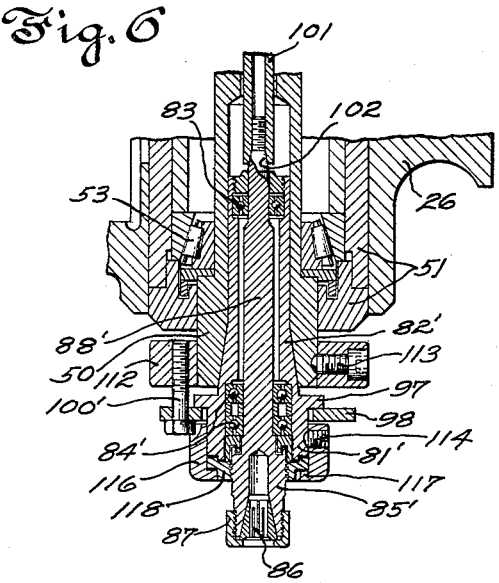
FIG. 6 shows a portion of the mechanism in FIG. 4 modified to enable the power source of conventional speed to drive the ultra high speed tool holding chuck.

By further modification of structure shown in FIG. 6 the slow speed motor 31 can drive the high speed chuck 85' while the ultra high speed motor 66' remains idle and can so act without removing the high speed motor and its transmission shaft 101 from the machine. This is accomplished by substituting for the draw bolts 100 in FIG. 4 a circular series of, say, three draw bolts 100' that thread, not into the quill 51', but into an anchorage collar 112 fixed rigidly on spindle 50 by means of set screw 113. There is then mounted fixedly on the lower end portion of bearing unit 81' by means of a set screw 114 a rotary drive collar 116 having one or more driving inward directed dog lugs drivingly engaged at 117 with a notch or socket in the periphery of the thrust collar 118 which is fast to the high speed chuck 85'. By this construction rotation of the slow speed spindle 50 causes rotation of the high speed chuck 85' in unison therewith so that the slow speed motor 31 of the conventional machine can, when desired, be caused to drive the high speed tool 21.

In operation it will have become evident from the foregoing description that when the relatively high speed light duty motor 66 or 66' stands de-energized and idle the relatively low speed heavy duty motor 31 can, in FIG. 6, drive the high speed clutch 85' at the relatively slow speed of the conventional machine tool of FIG. 5, or when preferred and by merely removing the dogging collar 116, the same high speed clutch 85' can be driven at ultra high speed by motor 66' (FIG. 3) while motor 31 remains idle. Any suitable arrangement of switch controlled separate electric circuits and electrical connections from motors 31 and 66 or 66' to a suitable source of electric power will provide the choice as to which of these motors shall be energized to drive the same cutting tool 21 while being fed into work by the same quill 51.

To avoid any whipping tendency which the considerable length of ultra speed drive shaft 101 might develop in an intermediate portion of its length it may be composed of conventional flexible shafting made of helical windings of flexible wire, such flexible shafting having suitable end fittings for uniting it to the ultra high speed chuck at one end and to the shaft of the high speed motor at the other end.

The prime mover 66 or 66' may be either an electric motor or a turbine type of motor or other type of motor, whatever, capable to attaining ultra high speed with requisite torque.

Among the advanatges of this invention is relief from what would be the high cost of equipping an ordinary milling head with rotary bearings that are suitable for ultra high speed operation, such bearings requiring great precision in size and perfect roundness of the bearing balls. Other elements of the more costly construction preferred in ultra high speed bearings are the use of aluminum reinforced phenolic ball retainers, specially constructed lubricant seals, and the spring loading of paired outer ball races in an axial direction, all calculated to reduce vibrational response to high rotary speed. By these improvements the owner of only a conventional milling head, or an owner making use of same for ultra high speed, light duty machining operations only on rare occasions, can satisfy all of his work requirements by applying the high speed tool driving equipments herein disclosed as an accessory to his conventional milling head.

The appended claims are directed to and intended to cover not only the varieties of embodiments of the invention herein disclosed, but all equivalent departures from such exact constructions and arrangements of the parts as come within a broad interpretation of the language of the claims.

I claim:

1. The combination with the frame of a machine tool of, a hollow quill slidably mounted on said frame, a hollow spindle rotatably journaled in the hollow of said quill in a manner to travel axially in unison therewith having at its exposed end a socket receptive to a tool holding chuck and communicating with the hollow of said spindle, a prime mover supported on said machine tool having a rotary drive shaft in coaxial alignment with the opposite end of said hollow spindle, a hollow shank removably lodged in said socket, rotary bearings in the hollow of said shank, a chuck journaled in said bearings thereby to be rotatable independently of said spindle, and power transmitting means extending through said hollow of said spindle operatively connecting said motor shaft with said chuck.

2. The combination defined in claim 1, in which the said prime mover is mounted on the said spindle and travels axially in unison therewith.

3. The combination defined in claim 1, in which the said prime mover is mounted on the said frame of the machine tool in a manner to remain bodily stationary while the said spindle slides endwise.

4. In a machine tool, the combination with plural sources of rotary power having contrasting ranges of rotary speed and a hollow quill for feeding a power driven cutting tool into work at said contrasting ranges of speed, of a machine frame in which said quill is slidably mounted, selectively usable power transmissions inside the hollow of said quill for rotating cutting tools while fed toward the work by said quill, one of said power transmissions including a hollow spindle having a tool receptive mouth and journaled with end thrust within said quill for rotation in a range of relatively low speeds while fed toward work by said quill, and the other of said power transmissions including a tool receptive chuck journaled with end thrust in respect to said mouth of said spindle in a manner to rotate independently thereof in a range of ultra high speeds while fed into work by said quill, together with a rotary drive shaft within and extending throughout the length of said hollow spindle connected to transmit power to said chuck at said ultra high rotary speeds.

5. In a machine tool, the combination defined in claim 4, in which the said hollow spindle and the said rotary shaft are coaxial, and said shaft is constructed in lengthwise separable sections whereby the same is removable from said spindle.

6. In a machine tool, the combination defined in claim 5, in which one of the said power sources comprises a prime mover mounted on an end of the said hollow spindle remote from the said mouth of the latter.

7. In a machine tool, the combination defined in claim 4, together with a rotary bearing unit lodged fixedly and removably in the said mouth of the said hollow spindle in which bearing the said chuck is journaled.

8. In a machine tool, the combination defined in claim 7, in which the said mouth of the said hollow spindle forms a conically tapered socket, and the said rotary bearing unit has a conically tapered shank fitting said mouth, together with screw threaded draw means having pulling connection with said bearing unit and having thrust affording anchorage relative to said hollow spindle whereby to force said shank into said socket.

9. In a machine tool, the combination defined in claim 4, in which both of the said power sources comprise relatively independent prime movers, each of said prime movers being stationed on the said machine frame.

10. In a machine tool, the combination defined in claim 9, in which the said rotary drive shaft is longitudinally slidable in relation to the said prime mover by which it is powered.

11. In a machine tool, the combination defined in claim 4, in which the said rotary drive shaft is hollow in at least a portion of its length.

12. In a machine tool, the combination defined in claim 8, in which the said draw means includes a rigid tube telescopically intermediate the said drive shaft and the said hollow spindle and has threaded engagement with the said bearing unit whereby to force the said shaft into the said socket.

13. In a machine tool, the combination defined in claim 8, in which the said draw means includes a thrust shoulder on the said bearing unit outside the said hollow spindle, together with draw bolts outside of said spindle pulling said thrust shoulder toward the said mouth of said spindle.

14. In a machine tool, the combination defined in claim 13, in which the said draw bolts are anchored in the said quill.

15. In a machine tool, the combination defined in claim 13, in which the said draw bolts are anchored to the said spindle independently of the said quill.

16. The combination with the endwise slidable hollow rotary spindle and spindle feeding single quill of a machine tool, of a machine frame in which said quill is slidable, a relatively slow speed prime mover mounted on said machine frame connected to rotate said spindle, a relatively high speed prime mover supported on said machine tool having a power output shaft in coaxial alignment with one end of said spindle, a rotary chuck adapted to hold and rotate a work cutter and rotatably supported in coaxial alignment with the opposite end of said spindle, driving connections between said spindle and said chuck enabling the former to drive the latter, and rotary power transmitting means operatively connecting said high speed prime mover with said chuck and extending through the hollow of said spindle whereby said chuck can be driven optionally by either of said prime movers.

References Cited in the file of this patent

UNITED STATES PATENTS

| | | |
|---|---|---|
| 1,488,534 | Folsom et al. | Apr. 1, 1924 |
| 1,594,903 | Gray | Aug. 3, 1926 |
| 2,454,235 | Tomek | Nov. 16, 1948 |

FOREIGN PATENTS

| | | |
|---|---|---|
| 879,940 | France | Dec. 10, 1942 |